(12) United States Patent
Matsuda

(10) Patent No.: US 9,815,375 B2
(45) Date of Patent: Nov. 14, 2017

(54) ELECTRIC VEHICLE AND OPERATION METHOD OF CONTROL DEVICE IN ELECTRIC VEHICLE

(75) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 692 days.

(21) Appl. No.: 14/369,672

(22) PCT Filed: Dec. 28, 2011

(86) PCT No.: PCT/JP2011/007360
§ 371 (c)(1),
(2), (4) Date: Oct. 7, 2014

(87) PCT Pub. No.: WO2013/098903
PCT Pub. Date: Jul. 4, 2013

(65) Prior Publication Data
US 2015/0042160 A1    Feb. 12, 2015

(51) Int. Cl.
*B60L 11/18*    (2006.01)
*B60L 3/00*    (2006.01)
*B62K 11/04*    (2006.01)

(52) U.S. Cl.
CPC ......... *B60L 11/1809* (2013.01); *B60L 3/0069* (2013.01); *B60L 11/1824* (2013.01);
(Continued)

(58) Field of Classification Search
CPC ........ B60L 3/00; B60L 11/14; B60L 11/1803; B60L 11/1861; B60L 11/1816;
(Continued)

(56) References Cited

U.S. PATENT DOCUMENTS 5,309,073 A    5/1994 Kaneko et al.
5,521,443 A    5/1996 Imura et al.
(Continued)

FOREIGN PATENT DOCUMENTS

JP    02018141 A    1/1990
JP    H10290534 A    10/1998
(Continued)

OTHER PUBLICATIONS

European Patent Office, Extended European Search Report Issued in Application No. 11878971.8, dated Sep. 10, 2015, 7 pages.
(Continued)

*Primary Examiner* — Jared Fureman
*Assistant Examiner* — Rafael Pacheco
(74) *Attorney, Agent, or Firm* — Alleman Hall Creasman & Tuttle LLP

(57) ABSTRACT

An electric vehicle comprises a cylinder lock including an operation key which is movable by a user's operation between a driving position and a charging position provided at a position different from the driving position and an output unit for outputting information indicative of a position of the operation key; and a main controller permits driving control and inhibits charging control when the operation key is moved to the driving position; and the main controller permits the charging control and inhibits the driving control when the operation key is moved to the charging position.

20 Claims, 5 Drawing Sheets

(52) U.S. Cl.
CPC .......... *B60L 11/1851* (2013.01); *B62K 11/04* (2013.01); *B60L 2200/12* (2013.01); *B62K 2204/00* (2013.01); *B62K 2208/00* (2013.01); *Y02T 10/7005* (2013.01); *Y02T 10/7072* (2013.01); *Y02T 90/12* (2013.01); *Y02T 90/121* (2013.01); *Y02T 90/14* (2013.01)

(58) Field of Classification Search
CPC ................... B60L 11/1864; B60L 11/1868; B60L 3/0069; B60L 3/04
See application file for complete search history.

(56) References Cited

U.S. PATENT DOCUMENTS

| | | | | |
|---|---|---|---|---|
| 5,994,789 A * | 11/1999 | Ochiai | ............... | B60L 11/1803 180/65.1 |
| 8,855,843 B2 * | 10/2014 | Kawasaki | ........... | B60L 11/1803 307/9.1 |

FOREIGN PATENT DOCUMENTS

| | | | |
|---|---|---|---|
| JP | 2001079129 A | 3/2001 |
| JP | 2007068358 A | 3/2007 |
| JP | 2011193715 A | 9/2011 |
| JP | 2013066290 A | 4/2013 |
| WO | 2011064634 A1 | 6/2011 |

OTHER PUBLICATIONS

Japanese Patent Office, International Search Report of PCT/JP2011/007360, dated Mar. 13, 2012, WIPO, 1 pages.

* cited by examiner

ELECTRIC VEHICLE AND OPERATION METHOD OF CONTROL DEVICE IN ELECTRIC VEHICLE

TECHNICAL FIELD

The present invention relates to a vehicle which uses electric energy as a driving power source.

BACKGROUND ART

In recent years, for the purpose of environmental conservation or the like, an electric vehicle which uses as a driving power source a motor activated by electric energy stored in a battery has been developed. Such an electric vehicle incorporates a charging connector to which an outside charging connector connected to an outside electric power supply is detachably attached, in order to charge the battery mounted in the vehicle with electric power supplied from the outside electric power supply.

In a conventional electric vehicle, an internal system controls switching between a discharging state in which the battery is connected to the motor and a charging state in which the battery is connected to the charging connector (see, e.g., Patent Literature 1).

CITATION LIST

Patent Literature

Patent Literature 1: Japanese Laid-Open Patent Application Publication No. 2011-193715

SUMMARY OF INVENTION

Technical Problem

However, in this configuration, it is likely that a rider who is not familiar with an operation (manipulation) cannot be aware that switching between the charging state and the discharging state has been accomplished, and as a result, the rider performs an incorrect operation.

Accordingly, an object of the present invention is to provide an electric vehicle which is capable of preventing the rider's incorrect operation.

Solution to Problem

To solve the above described problem, according to an aspect of the present invention, there is provided an electric vehicle comprising: an electric motor for generating driving power for moving a vehicle body of the electric vehicle; a battery for supplying electric power to the electric motor; an outside electric power supply connection unit connected to an outside electric power supply for supplying the electric power to be charged; a control device for controlling switching between a driving control state in which the battery is connected to the electric motor and a charging control state in which the battery is connected to the outside electric power supply connection unit; and an input device including an operation member which is movable by a user's operation between a driving position and a charging position provided at a position different from the driving position and an output unit for outputting information indicative of a position of the operation member; wherein the control device permits driving control and inhibits charging control when the operation member is moved to the driving position; and wherein the control device permits the charging control and inhibits the driving control when the operation member is moved to the charging position.

In this configuration, when the operation member is in the driving position, the electric vehicle is permitted to drive but is disenabled to be charged with the electric power, while when the operation member is in the charging position, the electric vehicle is permitted to be charged with the electric power but is disenabled to drive. Therefore, the rider cannot switch the control mode between the driving operation mode and the charging operation mode unless the rider moves the operation member intentionally. This allows the rider to know the present permission mode. In addition, it becomes possible to prevent a situation in which the electric vehicle drives under the charging state and charging is carried out under the driving state, without the rider's operation.

The electric vehicle may comprise a motion inhibiting device for inhibiting a motion of the electric vehicle; and the motion inhibiting device may operate to inhibit the motion of the electric vehicle, when the operation member is moved to the charging position.

In accordance with this configuration, the motion of the electric vehicle can be inhibited during the charging. The motion of the electric vehicle may be inhibited by locking a handle of the electric vehicle. For example, the handle may be locked by a force applied by the operation member itself, or may be locked by an actuator.

In the electric vehicle, the input device may include a cylinder lock and may be configured to switch an operation position of the operation member between the driving position and the charging position by rotation of a mechanical key inserted in the cylinder lock. In accordance with this configuration, since the cylinder lock is used as the input device, for example, the cylinder lock used in a conventional engine-driven vehicle can be used. This can reduce manufacturing cost.

In the electric vehicle, the mechanical key may be disengageable from the cylinder lock at the charging position. In accordance with this configuration, by disengaging the mechanical key from the cylinder lock during the charging, it becomes possible to prevent a third party's operation for shifting the control state to a state other than the charging state.

In the electric vehicle, the input device may have a power supply stop position provided at a position different from the driving position and the charging position; the operation member may be movable by a rider's operation among the driving position, the charging position, and the power supply stop position; and electric power supply to the control device may be cut off, and the driving control and the charging control may be inhibited, when the operation member is moved to the power supply stop position.

In accordance with this configuration, since the power supply stop position and the charging position are made different from each other, it becomes possible to prevent a situation in which the charging control is performed in the power supply stop (cut-off) state, and the control device can easily determine whether the present state is the power supply stop state or a charging preparation state. This can eliminate a need for a special program or sensor used for the determination.

In the electric vehicle, the power supply stop position may be present in the middle of a course of shifting from one of the driving position and the charging position to the other. In accordance with this configuration, when the switching between the discharging mode and the charging mode is performed, the electric power supply to the control device is cut off, and then the control device is reset. As a result, control stability can be improved.

In the electric vehicle, the input device may have a motion inhibiting position provided at a position different from the driving position, the charging position, and the power supply stop position; and electric power supply to the control device may be cut off, the driving control and the charging control are inhibited, and the motion inhibiting device may operate to inhibit the motion of the electric vehicle, when the operation member is moved to the motion inhibiting position.

In accordance with this configuration, since the motion inhibiting position is set, the electric vehicle can be appropriately placed in a storage state.

According to another aspect of the present invention, there is provided an electric vehicle comprising: an electric motor for generating driving power for moving a vehicle body of the electric vehicle; a battery for supplying electric power to the electric motor; an outside electric power supply connection unit connected to an outside electric power supply for supplying the electric power to be charged; a control device for controlling switching between a driving control state in which the battery is connected to the electric motor and a charging control state in which the battery is connected to the outside electric power supply connection unit; a display unit configured to display a driving display state and a charging display state different from the driving display state; and an operation unit operated by a user to perform switching between the driving display state and the charging display state; wherein the control device permits driving control and inhibits charging control when the display unit is shifted to the driving display state; and wherein the control device permits the charging control and inhibits the driving control when the display unit is shifted to the charging display state.

In accordance with this configuration, when the display unit is in the driving display state, the electric vehicle is permitted to drive but is disenabled to be charged with the electric power, while when the display unit is in the charging display state, the electric vehicle is permitted to be charged with the electric power but is disenabled to drive. Therefore, the rider cannot switch the control mode between the driving operation mode and the charging operation mode unless the rider intentionally moves the display unit using an operation unit. This allows the rider to know the present permission mode. In addition, it becomes possible to prevent a situation in which the electric vehicle drives under the charging state and charging is carried out under the driving state without the rider's operation.

To solve the above described problem, according to another aspect of the present invention, there is provided a method of operating a control device in an electric vehicle including an electric motor for generating driving power for moving a vehicle body of the electric vehicle; a battery for supplying electric power to the electric motor; an outside electric power supply connection unit connected to an outside electric power supply for supplying the electric power to be charged; a control device for controlling switching between a driving control state in which the battery is connected to the electric motor and a charging control state in which the battery is connected to the outside electric power supply connection unit; and an input device including an operation member which is movable by a user's operation between a driving position and a charging position provided at a position different from the driving position and an output unit for outputting information indicative of a position of the operation member, the method comprising: permitting driving control and inhibiting charging control when the operation member is moved to the driving position; and permitting the charging control and inhibiting the driving control when the operation member is moved to the charging position.

Advantageous Effects of Invention

In accordance with the present invention, it is possible to provide an electric vehicle which is capable of preventing a rider's incorrect operation.

DESCRIPTION OF EMBODIMENTS

Hereinafter, embodiments of the present invention will be described with reference to the accompanying drawings. Throughout the drawings, the same or corresponding components are designated by the same reference symbols and will not be described in repetition in detail, unless otherwise noted.

Embodiment 1

Figure 1:
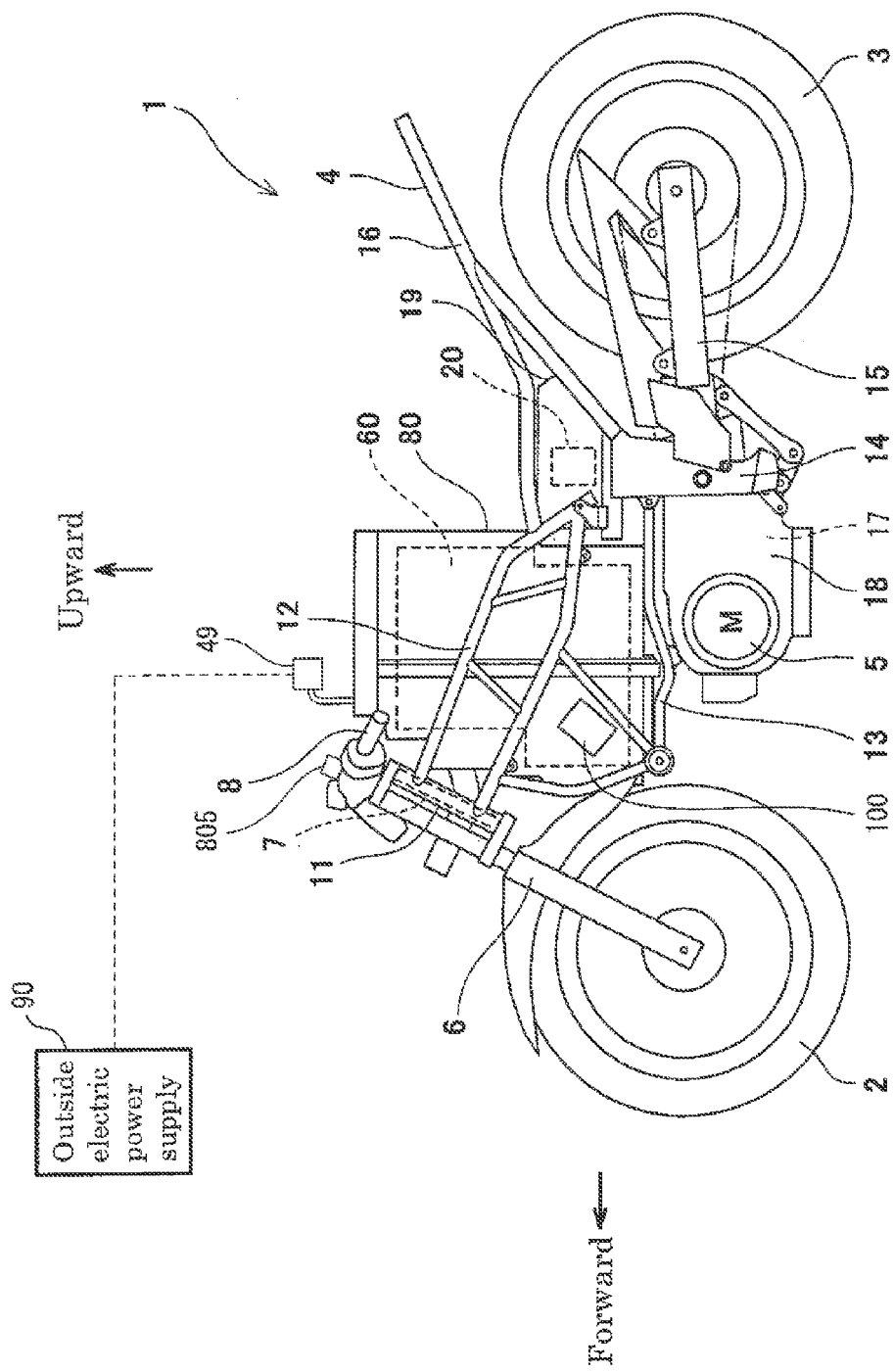
FIG. 1 is a left side view of an electric motorcycle as an exemplary electric vehicle according to Embodiment 1 of the present invention.

FIG. 1 is a left side view of an electric motorcycle as an exemplary electric vehicle according to an embodiment of the present invention. Although an electric motorcycle is exemplarily shown as the electric vehicle in FIG. 1, the electric vehicle is not limited to the electric motorcycle, but may be another straddle electric vehicle (electric three-wheeled vehicle or the like), an electric four-wheeled vehicle having a living space such as a multi-purpose vehicle, or an electric vehicle other than the vehicle, such as personal watercraft Or, the electric vehicle may be a hybrid electric vehicle, incorporating an internal combustion engine in addition to an electric motor.

As shown in FIG. 1, an electric motorcycle 1 includes a front wheel 2 which is a driven wheel, a rear wheel 3 which is a drive wheel, a vehicle body frame 4 which is disposed between the front wheel 2 and the rear wheel 3, and an electric motor 5 mounted to the vehicle body frame 4. The electric motorcycle 1 is not equipped with an internal combustion engine and is configured to rotate the rear wheel 3 by driving power generated by the electric motor 5.

The front wheel 2 is rotatably mounted to the lower portion of a front fork 6 extending substantially vertically such that it is inclined at a certain caster angle. A steering shaft 7 is coupled to the upper portion of the front fork 6, and a bar-type handle 8 is attached to the upper portion of the steering shaft 7. A right grip of the handle 8 is a throttle grip which is operated by the rider to adjust the driving power generated by the electric motor 5. A cylinder lock 805 is placed in the vicinity of the handle 8.

The vehicle body frame 4 includes a head pipe 11, a pair of right and left and a pair of upper and lower main frames 12, a pair of right and left down frames 13, a pair of right and left pivot frames 14, a pair of right and left swing arms 15, and a seat frame 16. The head pipe 11 supports the steering shaft 7 such that the steering shaft 7 is rotatable. The seat frame 16 supports a seat (not shown) on which the rider and a passenger are seated in a forward or rearward direction.

The electric motor 5 is placed in a region which is below the down frame 13 and in front of the pivot frame 14. The driving power generated by the electric motor 5 is transmitted to the rear wheel 3 via a driving power transmission mechanism 17. The electric motor 5 is accommodated in a motor case 18. The motor case 18 accommodates a transmission (not shown) constituting the driving power transmission mechanism 17 together with the electric motor 5, and is suspended from the down frame 13 and the pivot frame 14.

The electric motorcycle 1 incorporates an inverter case 19 and a battery case 80 in addition to the motor case 18 accommodating the electric motor 5. The inverter case 19 accommodates electric components including an inverter 20. The battery case 80 accommodates electric components including the battery unit 60. The inverter case 19 is placed in a space of a substantially-inverted triangular space when viewed from a side, which is surrounded by the main frame 12, the pivot frame 14 and the seat frame 16, and positioned just behind the lower rear end portion of the battery case 80. The battery case 80 is placed between the pair of right and left main frames 12, above the lower end portions of the pair of right and left down frames 13, and forward relative to the pivot frames 14.

The battery case 80 is provided with a charging connector 49 used for charging the battery unit 60 from an outside electric power supply 90 outside the electric motorcycle. For example, a fitting section of the charging connector 49 may be exposed to the outer surface of the battery case 80, or placed in an opening (charging port) of the battery case 80 and this opening may be covered with a specified cover.

Figure 2:
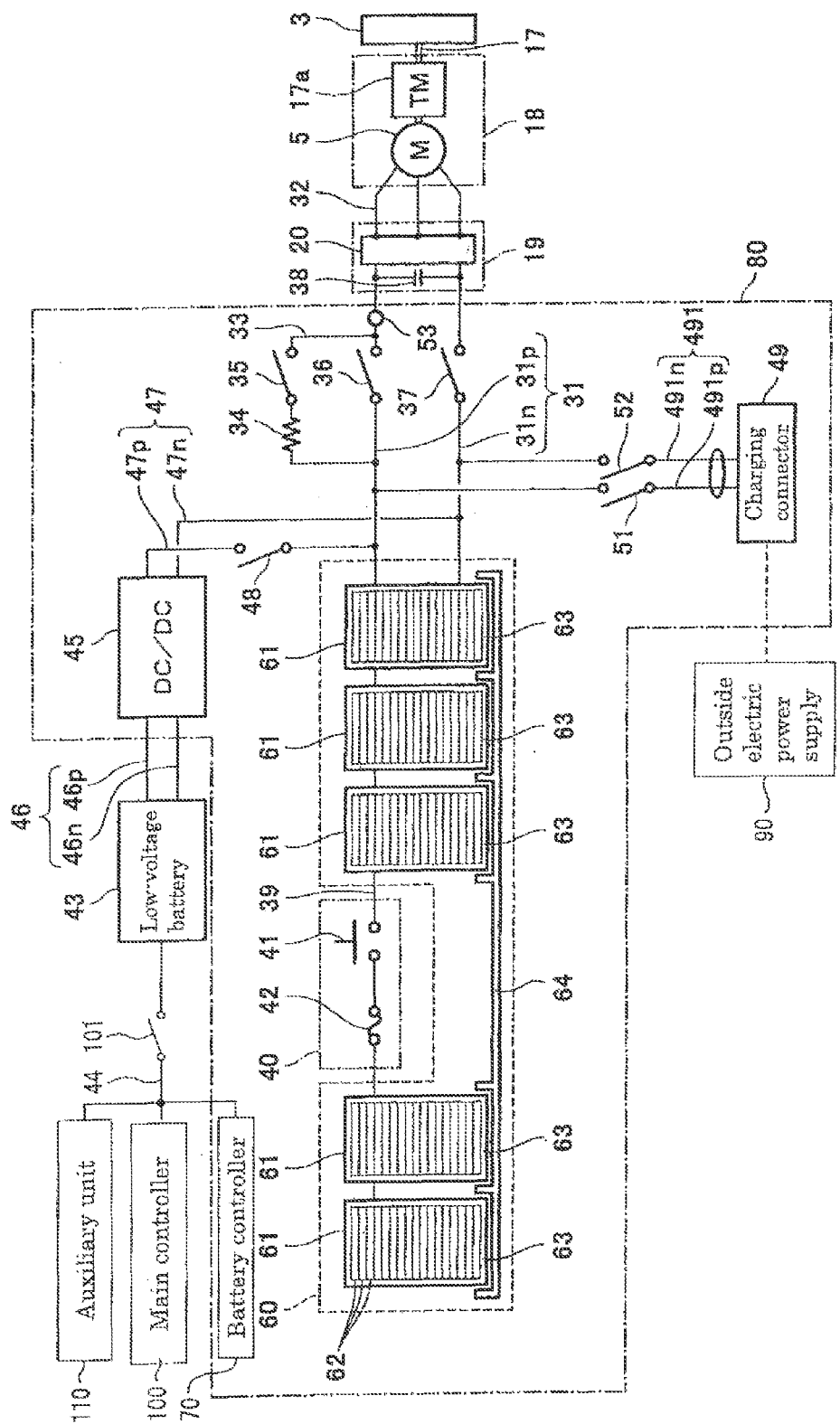
FIG. 2 is a block diagram showing electric wiring in the vicinity of a battery unit as an exemplary configuration of an electric system in the electric motorcycle of FIG. 1.

FIG. 2 is a block diagram showing electric wiring in the vicinity of the battery unit 60 as an exemplary configuration of an electric system in the electric motorcycle 1 of FIG. 1. In the block diagram of FIG. 2, the flow of a driving current is shown. As shown in FIG. 2, the battery unit 60 includes a plurality of battery modules 61 and a battery frame 64, and is a unit which serves as a high-voltage DC single secondary battery. Each of the battery modules 61 includes a plurality of battery cells 62 and a module casing 63 in a rectangular parallelepiped shape, for accommodating the plurality of battery cells 62. Each of the battery cells 62 is a secondary battery which is capable of storing DC power, and is, for example, a lithium ion battery or nickel metal hydride battery. The plurality of battery cells 62 are aligned and electrically connected to each other in the interior of the module casing 63. The plurality of battery modules 61 are densely arranged in the interior of the battery case 80 and electrically connected in series, in a state in which they are connected to and fastened to the battery frame 64.

As should be understood from the above, the battery unit 60 is configured such that many battery cells 62 are connected in series in an electric view point, and as a result serves as the secondary battery of a high-voltage current (e.g., 200 to 300V). The battery unit 60 is electrically connected to the charging connector 49 via a charging wire 491 composed of a P-side (positive-side) charging wire 491p and an N-side (negative-side) charging wire 491n and electrically and mechanically connected to the inverter 20 via a high-voltage electric wire 31 composed of a P-side power supply wire 31p and an N-side power supply wire 31n. The inverter 20 converts the high-voltage DC power sent from the battery unit 60 into three-phase AC power in accordance with a torque command or the like from a main controller 100, and supplies the three-phase AC power to the electric motor 5 via a three-phase AC wire 32. The electric motor 5 is activated by the AC power supplied from the inverter 20 to generate driving power corresponding to electric characteristics such as a current.

A P-side inverter relay 36 is provided on the P-side power supply wire 31p of the high-voltage electric wire 31. A bypass wire 33 which branches from the P-side power supply wire 31p is provided in parallel with the P-side inverter relay 36. A current steering resistor 34 and an anti-rush-current relay 35 are provided in series on the bypass wire 33. An N-side inverter relay 37 is provided on the N-side power supply wire 31n of the high-voltage electric wire 31.

The inverter case 19 contains a smoothing capacitor 38, the electrodes of which are connected between the P-side power supply wire 31p and the N-side power supply wire 31n. At activation of systems in the electric motorcycle 1, it becomes possible to prevent a rush current with an excessively great magnitude from flowing through the inverter 20 by the main controller 100's operation for suitably selecting OPEN or CLOSE for relays (35 to 37), even under a state in which charges are not accumulated in the smoothing capacitor 38. Hereinafter, the relays 35 to 37 will be referred to as driving relays 35 to 37. Current meter(s) 53 is/are attached onto the P-side power supply wire 31p, the N-side power supply wire 31n, and/or the bypass wire 33. In FIG. 2, a case where the current meter 53 is attached only on the P-side power supply wire 31p is exemplarily shown.

A service plug 40 is provided on a connection wire 39 connecting the battery modules 61 placed adjacently to each other. The service plug 40 includes a plug 41 for performing switching between continuity (conduction) and cutting off (disconnection) of the connection wire 39 and a fuse 42 for cutting off (disconnecting) the connection wire 39 if a current with an excessively great magnitude flows therethrough. A maintenance operator operates the plug 41 manually to enable switching between a power supply state in which the connection wire 39 is placed in a conductive state and the electric power can be supplied from the battery unit 60 to the electric motor 5 and a cut-off state in which the connection wire 39 is placed in a cut-off state and the electric power supply from the battery unit 60 to the electric motor 5 is cut off.

The electric motorcycle 1 includes a low-voltage battery 43 which is a secondary battery of low-voltage DC power (e.g., 12V), separately from the battery unit 60 which is an electric power supply for the electric motor 5. The low-voltage battery 43 is connected to a power load other than the electric motor 5, via a low-voltage electric wire 44. The power load which uses the low-voltage battery 43 as the electric power supply includes, for example, a battery controller 70 for monitoring the SOC (state of charge) of the battery unit 60, the inverter 20, the sensors, and the main controller 100 as a control device for controlling the overall electric motorcycle 1, including control for activating the inverter 20. In addition, the power load which uses the low-voltage battery 43 as the electric power supply includes a lighting device such as a head light, a tail lamp, and a direction indicator, instruments (gauges) such as a speed indicator, and a display unit (auxiliary unit 110 in FIG. 2). A low-voltage relay 101 is provided on the low-voltage electric wire 44 extending from the low-voltage battery 43 to the main controller 100, the auxiliary unit 110, and the battery controller 70. When the electric power is not supplied from the battery unit 60 to the inverter 20 (e.g., charging mode), the main controller 100 can activate the driving relays 35 to 37 to cut off (disconnect) the high-voltage electric wire 31 between the battery unit 60 and the inverter 20. On the other hand, when the electric power is supplied from the battery unit 60 to the inverter 20 (e.g., discharging mode), the main controller 100 can activate the driving relays 35 to 37 to connect the high-voltage electric wire 31 between the battery unit 60 and the inverter 20.

The low-voltage battery 43 is connected to a DC/DC converter 45 via a low-voltage converter wire 46 composed of a P-side power supply wire 46p and an N-side power supply wire 46n. The DC/DC converter 45 is connected to the P-side power supply wire 31p and the N-side power supply wire 31n of the high-voltage electric wire 31 via a high-voltage converter wire 47 composed of a P-side power supply wire 4'7p and an N-side power supply wire 47n. A DC/DC converter relay 48 is provided on a P-side power supply wire 4'7p and an N-side power supply wire 47n of the high-voltage converter wire 47. In FIG. 2, a case where the DC/DC converter relay 48 is provided on the high-voltage power supply wire 4'7p is exemplarily shown. The main controller 100 provides an opening/closing command to the converter relay 48.

The high-voltage electric wire 31 is connected to the charging connector 49 via the charging wire 491 composed of the P-side charging wire 491p and the N-side charging wire 491n. A P-side charging relay 51 is provided on the P-side charging wire 491p, while an N-side charging relay 52 is provided on the N-side charging wire 491n. The charging connector 49 is electrically connectable to the outside electric power supply 90 for charging the battery unit 60.

The main controller 100 provides commands to the driving relays 35 to 37 and the charging relays 51 and 52 to control switching between a first connection state in the discharging mode in which the battery unit 60 is connected to the electric motor 5 and a second connection state in the charging mode in which the battery unit 60 is connected to the charging connector 49.

In the first connection state, the electric motor 5 is activated by the electric power supplied from the battery unit 60, and thereby the electric motorcycle 1 can drive. During deceleration of the electric motorcycle 1, the electric motor 5 operates as an electric generator. In this case, the inverter 20 converts the AC power (regenerative power) generated by the electric motor 5 into DC power which is charged into the battery unit 60.

When the outside electric power supply 90 is electrically connected to the charging connector 49, in the second connection state, the electric power is supplied from the outside electric power supply 90 to the battery unit 60 via the charging wire 491 and the high-voltage electric wire 31 and charged into the battery unit 60. In addition, the electric power supplied from the outside electric power supply 90 can be charged into the low-voltage battery 43. Or, the DC/DC converter 45 can convert the DC power stored in the battery unit 60 into DC power for the low-voltage battery 43 which is charged into the low-voltage battery 43.

Figure 3:
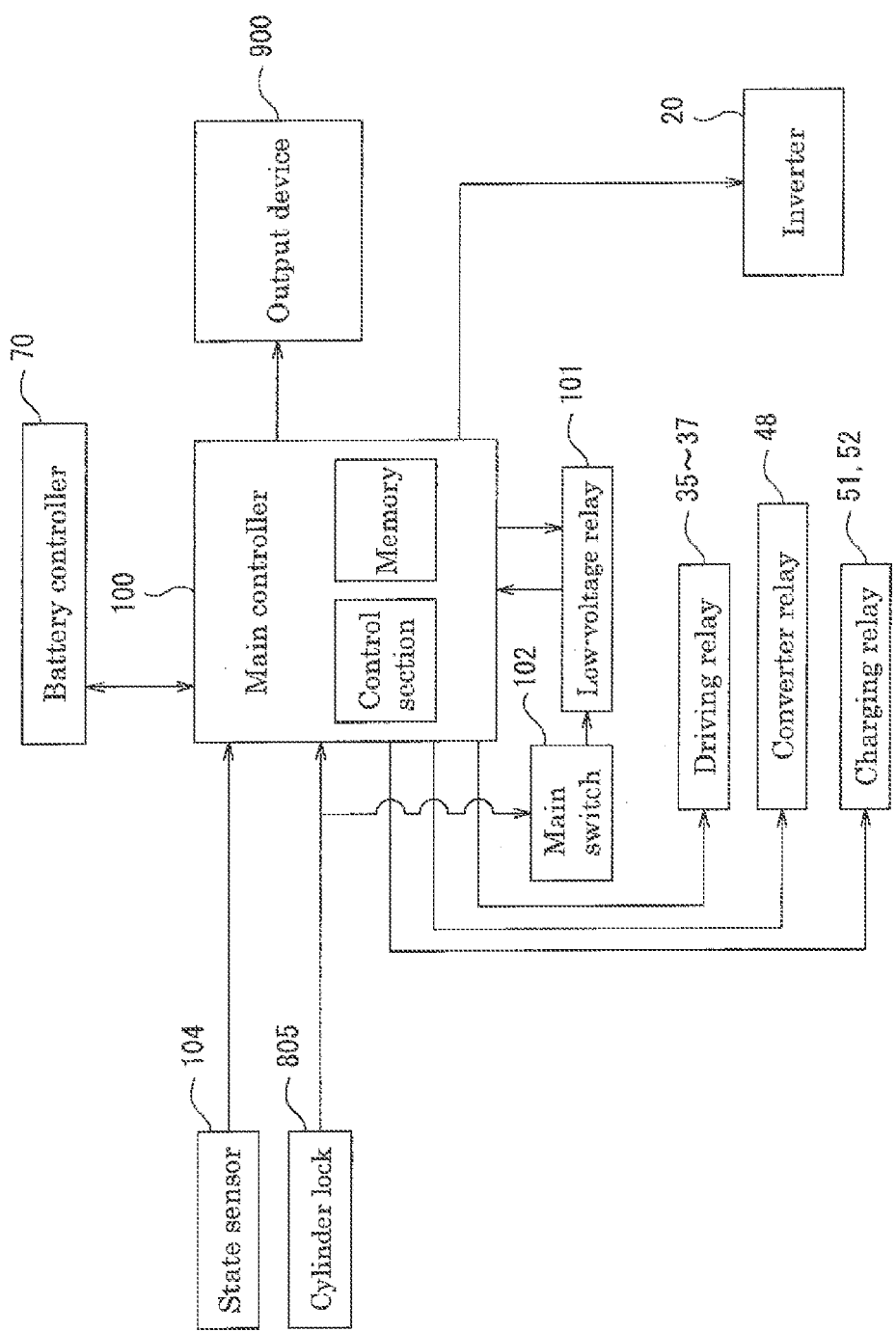
FIG. 3 is a block diagram showing a schematic configuration of components of a system in the vicinity of a main controller in the electric motorcycle of FIG. 1.

FIG. 3 is a block diagram showing a schematic configuration of components in the vicinity of the main controller 100 of a system in the electric motorcycle 1 of FIG. 1. In FIG. 3, arrows between the blocks indicate a signal flow. As shown in FIG. 3, the electric motorcycle 1 includes as major components the inverter 20, the main controller 100, a main switch 102, the battery controller 70, the low-voltage relay 101 for opening and closing a power supply path connected to the main controller 100, a cylinder lock 805 as an input device, an output device 900 such as a display unit, a monitor, and a speaker, and a state sensor 104 for detecting the states of the vehicle. The state sensor 104 is configured to detect the vehicle state(s) required for driving. The state sensor 104 may include, for example, one or a plurality of sensors selected from a vehicle speed sensor, a motor rotational speed sensor, a battery temperature sensor, a current sensor, a voltage sensor, a stand switch sensor, a gear position sensor, a driving mode switching command sensor, an accelerator sensor, a brake sensor, a connection determination sensor for the charging connector, and a sensor which determines whether or not the electric power is supplied from the charging connector.

The cylinder lock 805 is used as the input device which selectively performs switching between a charging permission state and a driving permission state. The cylinder lock 805 is used to perform switching between ON and OFF for the main switch 102 and lock the vehicle body. The cylinder lock 805 is configured such that a key hole is movable among a plurality of predetermined positions. The sensor attached to the cylinder lock 805 provides to the main controller 100 a signal indicative of a key hole position. By rotating a mechanical key inserted into the key hole in the cylinder lock 805, the key hole position can be changed. The main controller 100 switches the control mode based on the signal indicative of the key hole position provided by the cylinder lock 805. The main switch 102 performs switching between ON and OFF based on the signal indicative of the key hole position provided by the cylinder lock 805. In a state in which the mechanical key is disengaged from the key hole, the rotation of the key hole is inhibited. As the key hole positions, a driving position, a movement inhibiting position, a power supply stop position, and a charging position are set. The cylinder lock 805 is configured to output signals indicative of these positions.

The main controller 100 determines whether a present state is the driving permission state or the charging permission state based on the signal provided by the cylinder lock 805. When the main controller 100 determines that the present state is the driving permission state, it disconnects the charging relays 51, 52, and controls the driving relays 35 to 37 to initiate supplying of a driving current to the motor 5. On the other hand, when the main controller 100 determines that the present state is the charging permission state, it controls the driving relays 35 to 37 to stop the supplying of the driving current to the motor 5 and connects the charging relays 51, 52 to allow the electric power to be supplied via the charging connector 49. Or, when the main controller 100 determines that the low-voltage battery 43 is in a fully charged state, it commands the converter relay 48 to be disconnected, thereby preventing an excessive current. Or, when the main controller 100 determines that the SOC of the low-voltage battery 43 is equal to or less than a predetermined value, it connects the converter relay 48, thereby preventing excessive discharging.

When the main switch 102 receives a power supply stop signal (power supply stop position signal) from the cylinder lock 805, it disconnects the low-voltage relay 101. Or, when the main switch 102 receives the power supply signal (any position signal other than power supply stop position signal) from the cylinder lock 805, it connects the low-voltage relay 101. The operation of the main switch 102 in association with the key hole operation may be performed physically or electrically.

The low-voltage relay 101 opens the power supply path to cut off the electric power supply to the main controller 100 for a specified time when one of the first and second connection states is switched to the other connection state. In this configuration, when switching between the first connection state and the second connection state takes place, the electric power supply to the main controller 100 is cut off once, and then the main controller 100 is reset. This makes it possible to prevent switching between the first connection state and the second connection state in a state in which the electric power continues to be supplied to the main controller 100. As a result, control stability can be improved.

When the switching between the first connection state and the second connection state takes place, a program used for executing the corresponding mode is also selected, in addition to the connection state. Since a previous control mode is switched to a new control mode after the information stored in a RAM (random-access memory) in the previous control mode has been erased, it becomes possible to prevent a situation in which the previous information stored in the RAM will negatively affect the new control mode.

The battery controller 70 determines whether the present state is the charging permission state or the driving permission state in accordance with the command provided by the main controller 100. This makes it possible to carry out different control processes which are battery control in the charging permission state and battery control in the driving permission state. For example, in the charging permission state, only charging is performed in a state where there is relatively much time. However, in the driving permission state, regenerative charging and discharging are repeated. Therefore, by selecting a battery control program, charging and discharging can be performed more efficiently. Since the battery controller is reset when the mode is also switched, control stability can be improved.

When the main controller 100 receives a driving permission signal (driving position signal) from the cylinder lock 805, it inhibits the operation for charging the electric power from outside and executes a driving preparation program. When the driving preparation program is terminated, the main controller 100 shifts to a driving stand-by state. The driving preparation program includes an operation check, a relay operation, a command to the battery controller 70, etc. When the main controller 100 receives a driving start signal from the rider under the driving stand-by state, it computes a torque command according to a driving program, and provides the torque command to the inverter. The main controller 100 operates the battery controller 70 according to the driving program.

On the other hand, when the main controller 100 receives a charging permission signal (charging position signal) from the cylinder lock 805, it inhibits the operation for driving and executes a charging preparation program. When the driving preparation program is terminated, the main controller 100 shifts to a charging stand-by state. The charging preparation program includes an operation check, a relay operation, a command to the battery controller 70, etc. When the charging connector is connected in the charging stand-by state and thereby the electric power is supplied, the main controller 100 operates the battery controller 70 according to a charging program.

The cylinder lock 805 as the input device is configured to be operated by a user to command the main controller 100 to perform switching between the first connection state and the second connection state. In the present embodiment, the switching between ON and OFF for the main switch 102 is performed by the rider's operation of the cylinder lock 805. In response to the rider's operation, the low-voltage relay 101 is opened or closed via the main switch 102. In accordance with this configuration, for example, even if the user performs the switching operation many times within a short time by using the input device, the discharging mode or the charging mode is initiated in a state in which the main controller 100 is reset. As a result, control stability can be enhanced in a simple and inexpensive manner.

Figure 4:
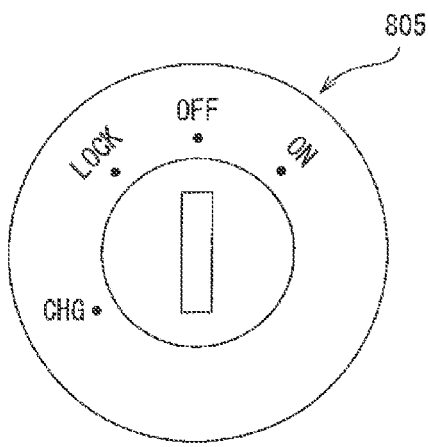
FIG. 4 is a plan view of a key hole of a cylinder lock of FIG. 1.

The output device 900 allows the rider to be notified of the vehicle states based on the information provided by the main controller 100 so that the rider can confirm the states. For example, the output device 900 displays the driving speed and the motor rotational speed. In addition, the output device 900 displays a driving mode, a gear ratio, a distance, a time, the SOC, etc. The output device 900 is implemented as an instrument panel and placed in front of the handle bar in a middle position in a vehicle width direction. In the present embodiment, the cylinder lock 805 is positioned in the vicinity of the instrument panel and in the vicinity of the handle. Alternatively, for example, the cylinder lock 805 may be placed within the instrument panel. By confirming the key hole and the position of the mechanical key inserted into the key hole, the permission state can be confirmed. This means that the cylinder lock also serves as a display unit for displaying the permission state. Or, the key hole position may be displayed on the instrument panel. For example, "D" is displayed on a monitor when the key hole position is the driving position, while "CHG" is displayed on the monitor when the key hole position is the charging position. By displaying the driving permission state and the charging permission state separately from the key hole, the rider can easily confirm the present state. Next, the cylinder key 805 as the input device will be descried specifically with referent to FIG. 4. The cylinder key 805 as the input device is placed in the vicinity of the handle 8 of the electric motorcycle 1. FIG. 4 is a plan view of the key hole of the cylinder lock 805. As shown in FIG. 4, the cylinder 805 is configured to allow the rider to select the operation position set in the key hole by rotating the mechanical key inserted into the key hole. The electric motorcycle 1 further includes a motion inhibiting device for inhibiting the motion of the vehicle body. In the present embodiment, as the motion inhibiting device, the electric motorcycle 1 includes a lock bar (not shown) for locking the handle 8 in response to the operation of the cylinder lock 805. The lock bar may lock the handle by a force applied by the mechanical key itself, or may be actuated by an actuator to lock the handle.

The cylinder lock 805 has four operation (manipulation) positions, which are the driving position (ON in FIG. 4), the power supply stop position (OFF in FIG. 4), the motion inhibiting position (LOCK in FIG. 4), and the charging position (CHG in FIG. 4), among which the key hole is movable. The power supply stop position is present in the middle of a course of shifting from one of the driving position and the charging position to the other. The rider can select any one of the four operation positions by rotating the mechanical key. In accordance with this configuration, the power supply stop position at which the low-voltage relay 101 is opened is placed between the driving position and the charging position, in an operation route of the input device operated by the rider. This allows the main controller 100 to be reset stably in a physical sense when switching between the first connection state and the second connection state is performed.

The mechanical key can be inserted into and disengaged from the key hole corresponding to any one of the power supply stop position, the motion inhibiting position, and the charging position. The mechanical key inserted into the key hole corresponding to the driving position is inhibited from being disengaged therefrom. When the mechanical key is in the motion inhibiting position or the charging position, the lock bar operates to lock the handle. Or, the mechanical key may be inhibited from being moved to the motion inhibiting position or the charging position unless the handle is rotated to the position at which the handle is locked. Likewise, since the charging position is placed separately from the power supply stop position, the charging control is carried out in the power supply stop state. This can eliminate a need to stand by because of a possibility of charging at the power supply stop position and the motion inhibiting position, and hence a need for a stand-by or determination program or a sensor used for stand-by or determination. Furthermore, since the cylinder lock is placed in the vicinity of the meters so that the rider riding in the electric motorcycle 1 can see the cylinder lock, the rider can know the state without displaying the driving permission state or the charging permission state on the monitor. Since the rider must perform the key operation to select the mode, the rider is easily aware of the mode selection.

In the power supply stop position (OFF), the motion inhibiting position (LOCK), and the charging position (CHG), the driving relays 35 to 37 are maintained in an open state, and therefore frequent activation of the relays is prevented. In the same manner, in the power supply stop position (OFF) and the motion inhibiting position (LOCK), the relay 101 is maintained in an open state, and therefore frequent activation of the relay is prevented. In the same manner, in the driving position (ON), the power supply stop position (OFF), and the motion inhibiting position (LOCK), the charging relays 51, 52 are maintained in an open state. Since the states of the relays continue, a degradation of the relays due to frequent switching can be suppressed. In the LOCK position and the CHG position, the handle lock state is maintained. Therefore, the operation for rotating the handle is omitted when the mechanical key is rotated from the LOCK position to the CHG position. The mechanical key is inserted into the key hole in the LOCK position and is easily rotated to the CHG position. Since the rider provides a mode selection command by rotating an operation member, specifically, the key hole, a size of a mode selecting operation means does not increase even when there are three or more operation positions. Since the mode selecting operation means is implemented by the cylinder lock, manufacturing cost can be reduced as compared to a case where an additional component is added.

In the power supply stop position, the mechanical key can be disengaged from the key hole of the cylinder lock 805. In the motion inhibiting position, the lock bar operates in response to the operation of the cylinder lock 805 to inhibit the motion of the vehicle body, and the mechanical key can be disengaged from the key hole of the cylinder lock 805. In this case, the cylinder key 805 inhibits the rotation of the key hole in a state in which the mechanical key is disengaged from the key hole.

In the charging position, like the motion inhibiting position, the lock bar operates to inhibit the motion of the vehicle body and the mechanical key can be disengaged from the key hole of the cylinder lock 805. This allows the user to lock the handle 8 of the electric motorcycle 1 and keep possession of the mechanical key in the charging mode. Therefore, a theft of the electric motorcycle 1 can be prevented during a charging work.

Next, the circuit state corresponding to each operation position of the cylinder lock 805 will be described with reference to FIGS. 3 and 4. In the driving position (ON), the relay 101 is closed via the main switch 102. Thereby, the electric power is supplied from the low-voltage battery 43 to the main controller 100, and a main system is activated. In the main system, the discharging control mode is executed. The main controller 100 enters the first connection state in which the battery unit 60 is connected to the electric motor 5. In this way, the electric motorcycle 1 is controlled to be able to drive. At this time, the charging relays 51, 52 are disconnected to disenable the electric motorcycle 1 to be charged with the electric power from the outside electric power supply.

In the power supply stop position (OFF), the relay 101 is opened via the main switch 102. Thereby, the electric power supply to the main controller 100 is stopped and the main system is shut down. In this state, the electric motorcycle 1 is disenabled to drive and be charged with the electric power.

In the motion inhibiting position (LOCK), the relay 101 is in an open state via the main switch 102. The electric power supply to the main controller 100 is cut off and the main system is shut down. In this state, the driving relays 35 to 37 are disconnected, and the electric motorcycle 1 is disenabled to drive and be charged with the electric power.

In the charging position (CHG), the relay 101 is closed via the main switch 102. Thereby, the electric power is supplied from the low-voltage battery 43 to the main controller 100, and the main system is activated. In the main system, the charging control mode is executed. The main controller 100 enters the second connection state in which the battery unit 60 is connected to the charging connector 49. In this way, the electric motorcycle 1 is enabled to be charged with electric power. At this time, the electric motorcycle 1 is disenabled to drive.

In the above described configuration, when the mechanical key is in the driving position (ON), the electric motorcycle 1 is permitted to drive but is disenabled to be charged with the electric power, while when the mechanical key is in the charging position (CHG), the electric motorcycle 1 is permitted to be charged with the electric power but is disenabled to drive. Therefore, the rider cannot switch the control mode between the driving operation mode and the charging operation mode unless the rider moves the mechanical key intentionally. This allows the user to know the present permission mode. In addition, it becomes possible to prevent a situation in which the electric motorcycle 1 drives under the charging state and charging is carried out under the driving state without the rider's operation.

Figure 5:
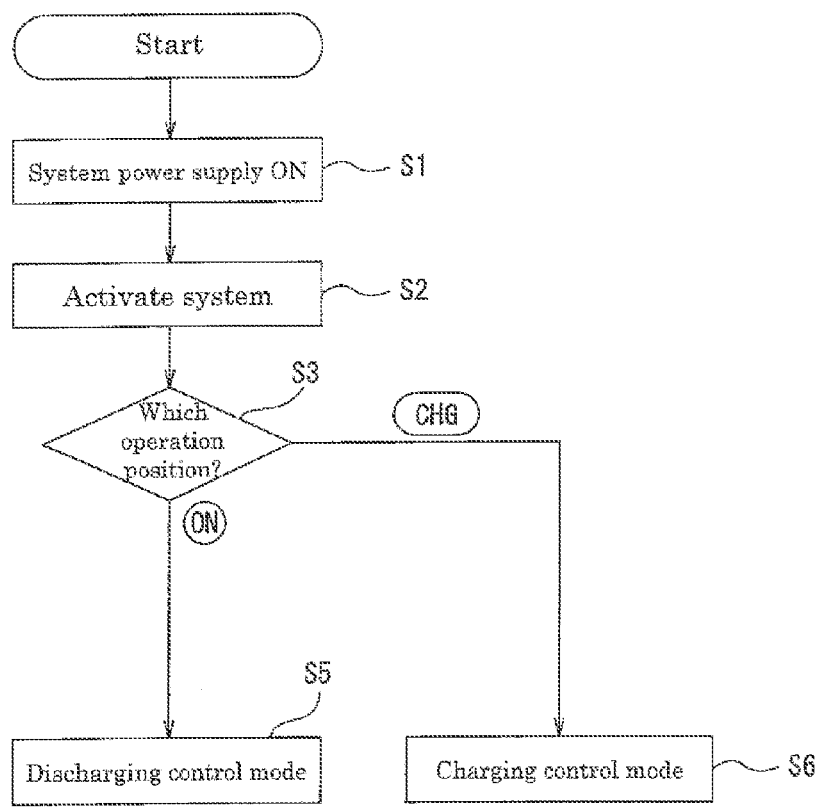
FIG. 5 is a flowchart showing an exemplary operation of a control device which is performed when a main system is activated.

Next, the operation of the main controller 100 which is performed when the main system is activated will be described with reference to the flowchart of FIG. 5. Initially, in the initial state, the main system is in a shut-down state. Then, the rider inserts the mechanical key in the key hole and rotates the key hole to the ON position or to the CHG position, and thereby the power supply of the system is turned ON (S1). Then, the main system is activated (S2). The main controller 100 determines which of the operation positions the mechanical key is in (S3). When the main controller 100 determines that the key hole is in the ON position and the mechanical key is in the driving position, it reads the discharging control program from the memory within the main controller 100 and shifts to the discharging control mode.

In the discharging control mode, the main controller 100 initiates the initial operation such as a self-diagnostic sequence and enters the first connection state (S5). Specifically, the main controller 100 causes the battery unit 60 and the electric motor 5 to be electrically connected to each other. In other words, the main controller 100 causes the driving relays 35 to 37 to be closed. On other hand, the main controller 100 causes the battery unit 60 and the charging connector to be electrically disconnected from each other. In other words, the main controller 100 causes the driving relays 35 to 37 to be opened.

On the other hand, when the main controller 100 determines that the key hole is in the CHG position and the mechanical key is in the charging position, it reads the charging control program from the memory within the main controller 100 and shifts to the charging control mode (S6). In the charging control mode, the main controller 100 executes the program stored in the memory of the main controller 100, performs the reset operation, and enters the second connection state. That is, the main controller 100 causes the battery unit 60 and the electric motor 5 to be electrically disconnected from each other. Specifically, the main controller 100 causes the driving relays 35 to 37 to be opened. In contrast, the main controller 100 causes the battery unit 60 and the charging connector to be electrically connected to each other. Specifically, the main controller 100 causes the charging relays 51 and 52 to be closed. Thus, in the state in which the charging connector 49 is electrically connected to the outside electric power supply 90 as a result of the rider's operation, the electric power can be supplied from the outside electric power supply 90 to the battery unit 60 via the charging connector 49. In this way, the battery unit 60 can be charged.

In the charging control mode, the main controller 100 determines whether or not the user's specified charging initiation operation has completed. Specifically, if the main controller 100 determines that the user's specified charging initiation operation has failed, it provides an alarm. Preferably, the alarm is provided by using an output device (head light, direction indicator, brake lamp, gauge display, horn, etc.) for use in driving of the electric motorcycle. This can reduce the number of components. Preferably, by using the device other than the gauge display, the rider can know that the user's specified charging initiation operation has failed even when the rider is away from the vehicle body. The instance of such a charging failure refers to a case where the rider intends to carry out charging but forgets to do some operation, for example, a case where the electric power is not supplied from outside even though the charging connector is connected, a case where the key is in the driving position even though the charging connector is connected, or a case where the charging connector is not connected even though the key is rotated to the charging position. In these cases, the alarm is provided. The alarm is preferably ceased after a passage of a predetermined time. Furthermore, the content of the operation mistake may be displayed on the monitor so that the rider can easily resolve the mistake. Or, information indicating that the charging is initiated correctly may be output to notify the rider of this information.

In many cases, after the charging is initiated, the rider moves away from the vehicle body. In the case of occurrence of the operation mistake, the rider does not easily realize that the operation mistake has occurred. If the rider does not realize that the operation mistake has occurred, time is wasted due to the charging failure. Since the information indicating whether the user's charging initiation operation has been performed correctly or failed is output to notify the rider as described above, the rider can know whether the user's charging initiation operation has been performed correctly or failed when the charging is initiated. This can prevent a situation in which the rider is away from the vehicle body even though the user's charging initiation operation has failed.

Figure 6:
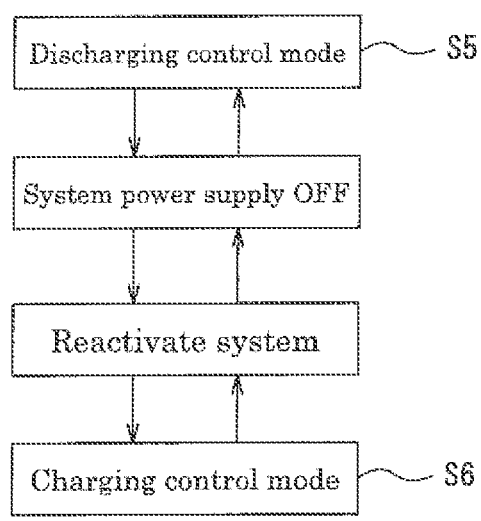
FIG. 6 is a flowchart showing an exemplary operation of the control device which is performed when switching between a discharging control mode and a charging control mode takes place.

Next, the operation of the main controller 100, which is performed when the discharging control mode is switched to the charging control mode, will be described with reference to the flowchart of FIG. 6. In this case, the rider's key operation is performed such that the key hole is moved from the driving position to the charging position by way of the power supply stop position.

When the mechanical key is in the driving position, the main system is in the above stated discharging control mode (S5), and the relay 101 connected to the main controller 100 is closed. The electric power is supplied from the low-voltage battery 43 to the main controller 100. The main system is operating.

When the mechanical key is moved to the power supply stop position, the main switch 102 is turned OFF. The relay 101 connected to the main controller 100 is opened. The electric power supply from the low-voltage battery 43 to the main controller 100 is cut off. The main system is shut down.

When the mechanical key is moved to the charging position, the main switch 102 is turned ON, and the relay 101 connected to the main controller 100 is closed. The electric power supply from the low-voltage battery 43 to the main controller 100 is initiated. The system is reactivated. Thereafter, the discharging control mode shifts to the charging control mode (S6).

Next, the operation of the main controller 100, which is performed when the charging control mode is switched to the discharging control mode, will be described with reference to the flowchart of FIG. 6. In this case, the rider's key operation is performed such that the key hole is moved from the charging position to the driving position by way of the power supply stop position.

When the mechanical key is in the charging position, the main system is in the above stated discharging control mode (S6), and the relay 101 connected to the main controller 100 is closed. The electric power is supplied from the low-voltage battery 43 to the main controller 100. The main system is operating.

When the mechanical key is moved to the power supply stop position, the main switch 102 is turned OFF. The relay 101 connected to the main controller 100 is opened. The electric power supply from the low-voltage battery 43 to the main controller 100 is cut off. The main system is shut down.

When the mechanical key is moved to the driving position, the main switch 102 is turned ON, and the relay 101 connected to the main controller 100 is closed. The electric power supply from the low-voltage battery 43 to the main controller 100 is initiated. The system is reactivated. Thereafter, the charging control mode shifts to the discharging control mode (S5).

As should be appreciated from the above, in a case where one of the discharging control mode and the charging control mode is switched to the other, the reset operation of the main controller 100 is performed before the control mode is shifted to the other control mode. This makes it possible to reset (reactivate) the main controller 100 in the middle of the switching of the control mode, and improve control stability.

In addition, since the electric power supply is resumed after the electric power supply to the main controller 100 is cut off, the main controller 100 is reactivated to perform the reset operation, and performs the other control mode after the reset operation takes place. This makes it possible to perform the reset operation more surely than in a case where the reset operation takes place in software in the main system.

Embodiment 2

In Embodiment 1 of the present invention, the reset operation of the main controller 100 which is performed by resuming supplying of the electric power after the electric power supply to the main controller 100 is cut off, is carried out by the rider's manual operation. In contrast, in Embodiment 2 of the present invention, the main controller 100 automatically performs the above stated reset operation. Hereinafter, differences from Embodiment 1 will be mainly described.

The present embodiment has basically the same configuration as that of Embodiment 1 of FIG. 3. As shown in FIG. 3, the main controller 100 includes therein a control section for performing control such that the relay 101 for opening and closing the power supply path connected to the main controller 100 is opened when the main controller 100 switches one of the first connection state and the second connection state to the other connection state. This eliminates a need for the rider's manual operation for commanding the relay 101 to open. In the present embodiment, it is supposed that, for example, the state sensor 104 has a function of detecting whether the charging connector 49 is connected or disconnected (fitted or disengaged), and the main controller 100 performs an activation process regarding one of the connection states based on the information detected by the state sensor 104. Specifically, when the main controller 100 determines that the charging connector 49 is connected, it determines that the connection state is shifted to the second connection state, and performs charging control after the reset operation of the electric power supply takes place. On the other hand, when the main controller 100 determines that the charging connector 49 is disconnected, it determines that the connection state is shifted to the first connection state, and performs charging control after the reset operation of the electric power supply takes place. Although in the present embodiment, the control section is placed within the main controller 100, it may be placed outside the main controller 100.

Or, when the main controller 100 determines that the position of the mechanical key is switched between the driving position and the charging position in the cylinder lock, it may perform the reset operation of the electric power supply irrespective of the operation of the main switch. In this case, the reset operation of the electric power supply may be performed even when the CHG position and the ON position are not placed at both sides of the OFF position. When a predetermined time passes after one of the driving position and the charging position is switched to the other, the electric power supply is cut off for a specified time by opening the relay. Since the main controller 100 determines that a predetermined time passes and cuts off the electric power supply for a specified time, it becomes possible to prevent the relay from being activated frequently due to an incorrect operation.

Regarding the reset operation, the electric power supply to a motor ECU and to a battery ECU may be cut off as well as the main controller 100. This allows the motor ECU and to the battery ECU to stably operate.

Or, a reset switch (corresponding to a kill switch in a gasoline-powered vehicle) which is operated to reset the electric power supply to the main controller may be provided at a position at which the rider riding in the electric motorcycle can operate the reset switch, for example, in the vicinity of the handle. When there is an abnormality in the system, the kill switch may be operated to restore the operation. Or, even when the rider performs the reset operation of the electric power supply in the middle of the rider's manual switching between the driving mode and the charging mode, the same advantages can be achieved. The reset switch may be configured to disenable the reset operation of the electric power supply during driving of the electric motorcycle and enable the reset operation of the electric power supply during stop of the electric motorcycle.

The switch operated to provide a driving permission command is placed at a position at which the rider riding the electric motorcycle in a steering position can operate the switch. Thereby, in a state in which the rider is in the steering position, the electric motorcycle is permitted to drive. Or, the switch operated to provide a charging permission command is placed at a position at which the rider in the steering position cannot reach. Thereby, shifting to the charging permission state can take place in a state in which the rider gets off the electric motorcycle. Thus, the switch operated to provide the driving permission command and the switch operated to provide the charging permission command may be distant from each other.

Although in the present embodiment, in the state in which the control section opens the relay 101, the electric power supply to the volatile memory within the main controller 100 is cut off, the electric power used to control the relay 101 is stored in a capacitor within the main controller 100. In this configuration, when the main controller 100 performs switching between the discharging control mode and the charging control mode, it opens the relay 101 for itself such that the volatile memory within the main controller 100 is reset, and can close the relay 101 with the electric power thereafter (e.g., after a passage of a short time (to be precise, after passage of 50 msec)).

Although in the above described embodiments, the main controller 100 as the control device is configured to perform both of the charging control and the discharging control, the present invention is not limited to this. The main controller 100 may be composed of a plurality of controllers which cooperate with each other to perform distributed control.

Although in the above described embodiments, the reset operation of the electric power supply is performed in both of the switching from the discharging mode to the charging mode and the switching from the charging mode to the discharging mode, the present invention is not limited to this. Alternatively, the reset operation of the electric power supply may be performed in either one of the switching from the discharging mode to the charging mode and the switching from the charging mode to the discharging mode. Since the reset operation of the electric power supply is performed in either one of the switching from the discharging mode to the charging mode and the switching from the charging mode to the discharging mode, a memory capacity of the RAM in the system can be reduced by utilizing a common storage area during the discharging and the charging.

Although in the above described embodiments, the relay 101 is opened manually by the rider or automatically by the main controller, the present invention is not limited to this. For example, the switch may be mechanically biased to be closed and may be opened by the electric power supplied from the main controller. In this configuration, when the main controller performs switching between the discharging mode and the charging mode, it opens the switch on the power supply path connected to the main controller, and thereafter the switch can be closed by a mechanical biasing force in a state in which the electric power supply to the switch is cut off.

Although in the above described embodiments, the main controller 100 determines that the charging initiation operation is completed correctly when the user's specified operation is completed, and causes the output device 900 to notify or display a result of the determination, it may determine that the charging initiation operation is not completed correctly when a state in which some of plural operations are not completed yet continues for a predetermined time or longer. In this configuration, it becomes possible to accurately detect the state in which the charging initiation operation has actually failed even though the user believes that the charging initiation operation has been completed, and notify or display this.

Although in the above described embodiments, the command of the open operation of the switch for opening and closing the power supply path connected to the main controller is input by using the cylinder lock as the input device, the present invention is not limited to this. For example, switching between the discharging mode and the charging mode may be performed by using a switch button, or a toggle switch, and a system electric power supply may be turned OFF within the system.

The operation positions of the key hole are not limited to those of FIG. 4 so long as the charging position is set different from the driving position. Preferably, the charging permission command is provided by using the same operation member as that for providing the driving permission command so that the rider is easily aware of switching of the mode.

Or, a common position may be used as the LOCK position and the CHG position. This can simplify the structure. The LOCK position and the CHG position may be reversed. The LOCK position or the CHG position, which is used more frequently, may be placed in the end portion of the cylinder lock in a rotational direction. This is more convenient because the key can be inserted and disengaged in a state in which the key hole is rotated to a rotation stop position in the mode frequently used.

The LOCK position and the CHG position may be placed at both sides of the ON position. Since the LOCK position and the CHG position are away from each other, the operation for moving to the LOCK position and the operation for moving to the CHG position can be made different from each other, and the rider easily realizes the difference. Likewise, the LOCK position and the CHG position may be placed at both sides of the OFF position. The motion may not be inhibited when the mechanical key is in the CHG position. In this case, the vehicle body can easily approach a charging area. Other key hole position such as ACC (accessory power supply) position or a hazard blinking position may be set. Or, a common position may be used as the ACC position and the CHG position. This can reduce the key hole positions. Or, the motion of the vehicle body may be inhibited by means other than the handle lock, for example, by inhibiting the rotation of the wheel.

Although the display unit displays the image of the driving permission or the charging permission, the present invention is not limited to this. For example, since it is determined whether the present state is the driving permission state or the charging permission state according to the motion of the mechanical key (operation member), the mechanical key itself may be the display unit.

Or, an operation member which is different from the cylinder lock may provide a command for switching the mode. In this case, also, the operation for switching between the driving permission state and the charging permission state is required. This may be performed using a seesaw switch, a switch that linearly moves a tab, or a switch that axially inserts and disengages a tab. In this way, as the operation member for switching between the driving permission state and the charging permission state, two switches, which are a charging permission switch used for permitting charging and inhibiting driving and a driving permission switch for permitting driving and inhibiting charging may be provided.

Or, one switch may be used for switching of the mode. In the case of using one switch, every time the switch is operated, the charging permission mode or the driving permission mode may be alternately selected. In this case, preferably, a display unit which displays the charging permission mode or the driving permission mode which is selected, is provided separately from the switch. This allows the rider to easily realize the present mode.

In the case of switching of the mode using the input device in which the driving position and the charging position are different, the reset operation of the electric power supply performed by operating the relay 101 may not be performed in switching of the mode. Or, in a case where the reset operation of the electric power supply is performed by operating the relay 101 in switching of the mode, an input device in which the driving position and the charging position are the same operation position may be used.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful in stably controlling switching between a charging mode and a discharging mode in an electric vehicle.

REFERENCE CHARACTER LIST

1 . . . electric motorcycle
2 . . . front wheel
3 . . . rear wheel
4 . . . vehicle body frame
5 . . . electric motor
6 . . . front fork
7 . . . steering shaft
8 . . . handle
11 . . . head pipe
12 . . . main frame
13 . . . down frame
14 . . . pivot frame
15 . . . swing arm
16 . . . seat frame
17 . . . driving power transmission mechanism 18 ... motor case
19 ... inverter case
20 ... inverter
43 ... low-voltage battery
44 ... low-voltage electric wire
45 ... DC/DC converter
48 ... DC/DC converter relay
49 ... charging connector
491 ... charging wire
51 ... P-side charging relay
52 ... N-side charging relay
60 ... battery unit
61 ... battery module
62 ... battery cell
63 ... module casing
64 ... battery frame
70 ... battery controller
80 ... battery case
90 ... outside electric power supply
100 ... main controller
101 ... low-voltage relay (opening and closing power supply path)
102 ... main switch
110 ... auxiliary unit
805 ... cylinder lock
900 ... output device

The invention claimed is:

1. An electric vehicle comprising:
an electric motor for generating driving power for moving a vehicle body of the electric vehicle;
a battery for supplying electric power to the electric motor;
an outside electric power supply connection unit connected to an outside electric power supply for supplying the electric power to be charged;
a control device for controlling switching between a driving control state in which the battery is connected to the electric motor and a charging control state in which the battery is connected to the outside electric power supply connection unit; and
an input device including an operation member which is movable by a user's operation between a driving position and a charging position provided at a position different from the driving position and an output unit for outputting information indicative of a position of the operation member;
wherein the control device permits driving control and inhibits charging control when the operation member is moved to the driving position;
wherein the control device permits the charging control and inhibits the driving control when the operation member is moved to the charging position; and
wherein the input device has a power supply stop position provided at a position different from the driving position and the charging position.

2. The electric vehicle according to claim 1, comprising:
a motion inhibiting device for inhibiting a motion of the electric vehicle;
wherein the motion inhibiting device operates to inhibit the motion of the electric vehicle, when the operation member is moved to the charging position.

3. The electric vehicle according to claim 2,
wherein the input device has a motion inhibiting position provided at a position different from the driving position, the charging position, and the power supply stop position; and
wherein electric power supply to the control device is cut off, the driving control and the charging control are inhibited, and the motion inhibiting device operates to inhibit the motion of the electric vehicle, when the operation member is moved to the motion inhibiting position.

4. The electric vehicle according to claim 1,
wherein the input device includes a cylinder lock and is configured to switch an operation position of the operation member between the driving position and the charging position by rotation of a mechanical key inserted in the cylinder lock.

5. The electric vehicle according to claim 4,
wherein the mechanical key is disengageable from the cylinder lock at the charging position.

6. The electric vehicle according to claim 5,
wherein the mechanical key is disengageable from the cylinder lock at the charging position, and at an operation position which is different from the charging position and is other than the driving position.

7. The electric vehicle according to claim 6,
wherein the mechanical key is disengageable from the cylinder lock at the charging position, and at the motion inhibiting position.

8. The electric vehicle according to claim 1,
wherein the operation member is movable by a rider's operation among the driving position, the charging position, and the power supply stop position; and
wherein electric power supply to the control device is cut off, and the driving control and the charging control are inhibited, when the operation member is moved to the power supply stop position.

9. The electric vehicle according to claim 8,
wherein the input device has a motion inhibiting position provided at a position different from the charging position.

10. The electric vehicle according to claim 1,
wherein the power supply stop position is present in the middle of a course of shifting from one of the driving position and the charging position to the other.

11. The electric vehicle according to claim 1,
wherein the output unit displays on a monitor information indicating that the operation member is at the charging position.

12. The electric vehicle according to claim 1,
wherein in the charging control, the control device determines whether or not a charging initiation operation is completed, and provides an alarm when the control device determines that the charging initiation operation has failed.

13. The electric vehicle according to claim 12,
wherein the control device provides the alarm by using an output device used in driving of the electric vehicle.

14. The electric vehicle according to claim 1,
wherein a reset operation of electric power supply to the control device is performed in the middle of shifting from one of the driving control and the charging control to the other.

15. An electric vehicle comprising:
an electric motor for generating driving power for moving a vehicle body of the electric vehicle;
a battery for supplying electric power to the electric motor;
an outside electric power supply connection unit connected to an outside electric power supply for supplying the electric power to be charged;

a control device for controlling switching between a driving control state in which the battery is connected to the electric motor and a charging control state in which the battery is connected to the outside electric power supply connection unit; and an input device including a display unit configured to display a driving display state and a charging display state different from the driving display state, an operation unit operated by a user to perform switching between the driving display state and the charging display state, and an output unit for outputting information indicating a display state;

wherein the control device permits driving control and inhibits charging control when the display unit is shifted to the driving display state;

wherein the control device permits the charging control and inhibits the driving control when the display unit is shifted to the charging display state; and wherein the input device has a power supply stop position provided at a position different from the driving position and the charging position.

16. The electric vehicle according to claim 15, wherein a reset operation of electric power supply to the control device is performed in the middle of shifting from one of the driving control and the charging control to the other.

17. The electric vehicle according to claim 15, further comprising:

a motion inhibiting device for inhibiting a motion of the electric vehicle;

wherein the motion inhibiting device operates to inhibit the motion of the electric vehicle, when the operation member is moved to the charging position.

18. A method of operating a control device in an electric vehicle including an electric motor for generating driving power for moving a vehicle body of the electric vehicle; a battery for supplying electric power to the electric motor; an outside electric power supply connection unit connected to an outside electric power supply for supplying the electric power to be charged; a control device for controlling switching between a driving control state in which the battery is connected to the electric motor and a charging control state in which the battery is connected to the outside electric power supply connection unit; and an input device including an operation member which is movable by a user's operation between a driving position and a charging position provided at a position different from the driving position and an output unit for outputting information indicative of a position of the operation member, the method comprising:

permitting driving control and inhibiting charging control when the operation member is moved to the driving position; and permitting the charging control and inhibiting the driving control when the operation member is moved to the charging position, wherein the input device has a power supply stop position provided at a position different from the driving position and the charging position.

19. The electric vehicle according to claim 18, wherein a reset operation of electric power supply to the control device is performed in the middle of shifting from one of the driving control and the charging control to the other.

20. The electric vehicle according to claim 18, further comprising:

a motion inhibiting device for inhibiting a motion of the electric vehicle;

wherein the motion inhibiting device operates to inhibit the motion of the electric vehicle, when the operation member is moved to the charging position.

\* \* \* \* \*